(12) United States Patent
Yan et al.

(10) Patent No.: US 11,522,793 B2
(45) Date of Patent: Dec. 6, 2022

(54) STITCHING LABEL SENDING METHOD, RECEIVING METHOD, AND DEVICE

(71) Applicant: Huawei Technologies Co., Ltd., Shenzhen (CN)

(72) Inventors: Hongbo Yan, Shenzhen (CN); Chun Liu, Beijing (CN); Litao Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 92 days.

(21) Appl. No.: 17/023,719

(22) Filed: Sep. 17, 2020

(65) Prior Publication Data

US 2021/0006492 A1    Jan. 7, 2021

Related U.S. Application Data

(63) Continuation of application No. PCT/CN2019/078396, filed on Mar. 16, 2019.

(30) Foreign Application Priority Data

Mar. 19, 2018  (CN) .......................... 201810225245.2

(51) Int. Cl.
*H04L 45/50* (2022.01)
*H04L 45/00* (2022.01)

(52) U.S. Cl.
CPC .............. *H04L 45/50* (2013.01); *H04L 45/54* (2013.01)

(58) Field of Classification Search
CPC combination set(s) only.
See application file for complete search history.

(56) References Cited

U.S. PATENT DOCUMENTS 7,839,847 B2 * 11/2010 Nadeau ................ H04L 43/026
370/395.5
9,954,773 B2   4/2018 Hu et al.
(Continued)

FOREIGN PATENT DOCUMENTS

CN    102907051 A    1/2013
CN    103269315 A    8/2013
(Continued)

OTHER PUBLICATIONS

Zheng, L., "LDP and RSVP-TE Extensions for Label Stack Distribution draft-li-mpls-label-stack-distribution-00," Network Working Group, Internet-Draft, Intended Status: Standards Track, Expires: Apr. 24, 2014, Huawei Technologies, Oct. 21, 2013, 6 pages.
(Continued)

*Primary Examiner* — Xavier S Wong
(74) *Attorney, Agent, or Firm* — Slater Matsil, LLP

(57) ABSTRACT

A stitching label sending method, receiving method, and a device, the sending method including receiving, by a controller, first label range information sent by an intermediate device, where the first label range information indicates a first label range in a plurality of label ranges of the intermediate device, selecting, by the controller, a label from the first label range as a stitching label, and sending, by the controller, to the intermediate device, the stitching label and a first label stack corresponding to the stitching label, where the first label stack indicates a first label switched path starting from the intermediate device.

14 Claims, 4 Drawing Sheets

(56) References Cited

U.S. PATENT DOCUMENTS

| | | | |
|---|---|---|---|
| 10,432,515 B1* | 10/2019 | Sajassi | H04L 45/50 |
| 2005/0220072 A1* | 10/2005 | Boustead | H04L 45/00 370/428 |
| 2012/0176930 A1* | 7/2012 | So | H04L 45/50 370/254 |
| 2015/0029849 A1 | 1/2015 | Frost et al. | |
| 2015/0103844 A1 | 4/2015 | Zhao et al. | |
| 2016/0234106 A1* | 8/2016 | Li | H04L 45/50 |
| 2016/0285755 A1 | 9/2016 | Ferguson | |
| 2018/0205642 A1 | 7/2018 | Li et al. | |

FOREIGN PATENT DOCUMENTS

| | | |
|---|---|---|
| CN | 103685019 A | 3/2014 |
| CN | 103973568 A | 8/2014 |
| CN | 105471737 A | 4/2016 |
| CN | 105871721 A | 8/2016 |
| CN | 105871722 A | 8/2016 |
| CN | 105991437 A | 10/2016 |
| CN | 106549870 A | 3/2017 |
| EP | 2747356 A1 | 6/2014 |
| WO | 2014012207 A1 | 1/2014 |
| WO | 2016131225 A1 | 8/2016 |
| WO | 2017045561 A1 | 3/2017 |
| WO | 2019007390 A1 | 1/2019 |

OTHER PUBLICATIONS

Dugeon, O. et al., "PCEP Extension for Stateful Inter-Domain Tunnels draft-dugeon-pce-stateful-interdomain-00," XP015122528, Path Computation Element Working Group, Internet-Draft, Intended status: Standards Track, Expires Apr. 30, 2018, Oct. 17, 2017, 22 pages.

Dugeon, O. et al., "A Backward Recursive PCE-Initiated inter-domain LSP Setup draft-dugeon-brpc-stateful-00," XP015118642, Internet-Draft, Intended Status: Standards Track, Expires: Sep. 14, 2017, Mar. 13, 2017, 16 pages.

Farrel, A. et al., "Interconnection of Segment Routing Domains—Problem Statement and Solution Landscape draft-farrel-spring-sr-domain-interconnect-03,"XP015125048, SPRING Working Group, Internet-Draft, Intended Status nformational, Expires: Jul. 10, 2018, Juniper Networks, Jan. 6, 2018, 34 pages.

Lee, Y. et al., "PCEP Extensions for Stitching LSPs in Hierarchical Stateful PCE Model draft-lee-pce-lsp-stitching-hpce-00.txt," XP015120312, PCE Working Group, Internet Draft, Intended Status: Standard, Expires Nov. 2017, Jun. 26, 2017, 14 pages.

\* cited by examiner

STITCHING LABEL SENDING METHOD, RECEIVING METHOD, AND DEVICE

CROSS-REFERENCE TO RELATED APPLICATIONS

This application is a continuation of International Application No. PCT/CN2019/078396, filed on Mar. 16, 2019, which claims priority to Chinese Patent Application No. 201810225245.2, filed on Mar. 19, 2018. The disclosures of the aforementioned applications are hereby incorporated by reference in their entireties.

TECHNICAL FIELD

This application relates to the communications field, and in particular, to a stitching label sending method, receiving method, and a device.

BACKGROUND

Segment routing (SR) is a multiprotocol label switching (MPLS) technology implemented by extending an Interior Gateway Protocol (IGP). An ingress device pushes a label stack indicating an entire label switched path (LSP) into a packet. Each intermediate forwarding device (which may also be referred to as an intermediate device or an intermediate node) performs a forwarding operation on the packet based on the label stack, so that the packet is forwarded along the label switched path until the packet arrives at an egress device. Therefore, a label switched path (which may also be referred to as a forwarding path) of the packet in an entire network may be controlled.

When the label switched path is relatively long and a required label stack depth exceeds a label stack depth supported by the intermediate device, one label stack cannot carry labels of all devices on the entire label switched path. Labels used on the entire path may be classified into a plurality of label stacks for carrying, and adjacent label stacks are stitched (which may also be referred to as "binding") by the intermediate device by using a stitching label. The stitching label needs to occupy a label resource on the intermediate device. However, the label resource on the intermediate device is limited. There is no satisfactory solution for how to use the stitching label by effectively using the label resource on the intermediate device.

SUMMARY

Embodiments of this application provide a method, a controller, and an intermediate device for how to use a stitching label by effectively using a label resource on the intermediate device.

According to a first aspect, an embodiment of this application provides a stitching label sending method. The method includes: receiving, by a controller, first label range information sent by an intermediate device, where the first label range information may indicate one label range (namely, a first label range) in a plurality of label ranges of the intermediate device; selecting, by the controller, a label from the first label range as a stitching label; and sending the stitching label and a first label stack corresponding to the stitching label to the intermediate device, where the first label stack indicates a segment of label switched path (namely, a first label switched path) starting from the intermediate device.

In the solution provided in this embodiment of this application, a label resource on the intermediate device is divided into a plurality of label ranges, and a label range is provided for the controller on a per-label range basis. Therefore, label resource utilization is improved when the stitching label is allocated and used based on the label resource on the intermediate device.

Optionally, before receiving the first label range information, the controller may first send a label request message to the intermediate device. The label request message is used to request the first label range information, so that the intermediate device returns the first label range information. This helps implement on-demand allocation. Only when the controller needs to use the stitching label, the intermediate device returns label range information to provide a label range, so as to further improve label resource utilization.

Optionally, the controller stores second label range information. The second label range information may indicate one label range (namely, a second label range) in the plurality of label ranges of the intermediate device. The controller sends the label request message after detecting that a quantity of available labels in the second label range is less than a first threshold or a proportion of an available label in the second label range to all labels in the second label range is less than a second threshold. The available label in the second label range refers to a label that is not selected as the stitching label in the second label range. The controller first detects a quantity or proportion of currently available labels, and when the quantity or proportion of available labels is insufficient, requests a new label range from the intermediate device. This helps implement dynamic on-demand application of a label range, and a label range is dynamically allocated based on an actual use status. Therefore, this further improves label resource utilization.

Optionally, before sending the stitching label and the first label stack corresponding to the stitching label to the intermediate device, the controller first calculates a second label switched path from an ingress device to an egress device. The intermediate device is located between the ingress device and the egress device on the second label switched path, and the first label switched path is a segment of path on the second label switched path. Then, the controller generates a plurality of label stacks based on the second label switched path. Each of the plurality of label stacks indicates a segment of label switched path on the second label switched path, and the plurality of label stacks include the first label stack. In this way, the entire label switched path from the ingress device to the egress device is divided into a plurality of segments, and each intermediate device may perform label stack processing on a received packet based on a received stitching label and a corresponding label stack, and forward the packet, so as to implement forwarding of the packet on the entire label switched path.

Optionally, after sending the stitching label and the first label stack corresponding to the stitching label to the intermediate device, the controller sends a second label stack to the ingress device. The second label stack includes the stitching label. In the second label stack, from a topmost label to the stitching label, a label before the stitching label indicates a third label switched path. The third label switched path is a segment of label switched path from the ingress device to the intermediate device on the second label switched path, and the third label switched path is a first segment of path starting from the ingress device on the entire label switched path. The label stacks generated by the controller based on the entire label switched path includes the second label stack. In this solution, after receiving the second label stack sent by the controller, the ingress device may start to forward the packet on the entire label switched path based on the second label stack.

According to a second aspect, an embodiment of this application provides a stitching label receiving method. The method includes: sending, by an intermediate device, label range information to a controller, where the label range information indicates one label range in a plurality of label ranges of the intermediate device; and receiving, by the intermediate device, a stitching label and a label stack corresponding to the stitching label that are sent by the controller, where the label stack indicates a segment of label switched path starting from the intermediate device, and the stitching label is in the one label range. The controller allocates the stitching label by using the label range provided by the intermediate device, and sends the stitching label to the intermediate device. The intermediate device may replace a stitching label in a packet with a label stack based on the stitching label and the label stack corresponding to the stitching label, so that the packet can be forwarded on the segment of label switched path starting from the intermediate device. In this way, the stitching label is allocated and used, and label resource utilization is improved.

Optionally, the intermediate device may first receive a label request message from the controller, and then send the label range information to the controller in response to the label request message.

Optionally, the intermediate device first detects that a label range is available, and then sends label range information indicating the label range. When selecting a label range provided for the controller, the intermediate device selects the label range from an available label range, to avoid repeated use of the label range, and ensure that the label range provided for the controller is available (in other words, not used).

Optionally, after receiving the stitching label, the intermediate device may record that a label range in which the stitching label is located is used. The intermediate device may record a used label range based on a range in which the received stitching label is located, and the received stitching label may reflect a label range actually used by the controller.

Optionally, after using any label in any label range as an adjacent label or a node label, the intermediate device records that the any label range is used. After label resources that are originally used for the stitching label and that are on the intermediate device are divided into a plurality of label ranges, the intermediate device may use one or more of the plurality of label ranges to allocate the adjacent label or the node label. Therefore, label resource utilization is improved. After using one label range for allocating the adjacent label or the node label, repeated use of the label range may be avoided by recording that the one label range is used.

Optionally, the intermediate device sets the plurality of label ranges based on a label resource on the intermediate device. The intermediate device sets the plurality of label ranges based on the label resource of the intermediate device, and provides, for the controller at a granularity of a label range, a label range used for allocating the stitching label. This helps improve label resource utilization.

Optionally, after the intermediate device receives the stitching label and the corresponding label stack that are sent by the controller, the intermediate device may forward a packet on a label forwarding path. The intermediate device receives a first packet including the stitching label, replaces the stitching label in the first packet with the corresponding label stack to obtain a second packet, and sends the second packet to a next hop device of the intermediate device on a label switched path (a label switched path indicated by the label stack corresponding to the stitching label). In this way, label stacks on a stitching device are stitched.

According to a third aspect, an embodiment of this application provides a controller for sending a stitching label. The controller performs the method according to the first aspect or any one of the possible implementations of the first aspect. Specifically, the controller includes a unit configured to perform the method according to the first aspect or any one of the possible implementations of the first aspect.

According to a fourth aspect, an embodiment of this application provides an intermediate device for receiving a stitching label. The intermediate device performs the method according to the second aspect or any one of the possible implementations of the second aspect. Specifically, the intermediate device includes a unit configured to perform the method according to the second aspect or any one of the possible implementations of the second aspect.

According to a fifth aspect, an embodiment of this application provides a controller for sending a stitching label. The controller includes a processor and a memory. The memory stores a computer program instruction, and the processor is configured to execute the computer program instruction, so that the controller is enabled to perform the sending method according to the first aspect or any one of the possible implementations of the first aspect.

According to a sixth aspect, an embodiment of this application provides an intermediate device for receiving a stitching label. The intermediate device includes a processor and a memory. The memory stores a computer program instruction, and the processor is configured to execute the computer program instruction, so that the intermediate device is enabled to perform the receiving method according to the second aspect or any one of the possible implementations of the second aspect.

According to a seventh aspect, an embodiment of this application provides a computer storage medium, configured to store a computer program instruction. When the computer program instruction is executed by a controller, the controller is enabled to perform the sending method according to the first aspect or any one of the possible implementations of the first aspect.

According to an eighth aspect, an embodiment of this application provides a computer storage medium, configured to store a computer program instruction. When the computer program instruction is executed by an intermediate device, the intermediate device is enabled to perform the receiving method according to the second aspect or any one of the possible implementations of the second aspect.

According to a ninth aspect, an embodiment of this application provides a system. The system includes the controller provided in the third aspect and the intermediate device provided in the fourth aspect, or the system includes the controller provided in the fifth aspect and the intermediate device provided in the sixth aspect.

According to a tenth aspect, an embodiment of this application provides a computer program product including a computer program instruction. When the computer program product runs on a controller, the controller is enabled to perform the sending method according to the first aspect or any one of the possible implementations of the first aspect.

According to an eleventh aspect, an embodiment of this application provides a computer program product including a computer program instruction. When the computer program product runs on an intermediate device, the intermediate device is enabled to perform the receiving method according to the second aspect or any one of the possible implementations of the second aspect.

DETAILED DESCRIPTION OF ILLUSTRATIVE EMBODIMENTS

To make objectives, technical solutions, and advantages of this application clearer, the following further describes implementations of this application in detail with reference to the accompanying drawings.

Figure 1:
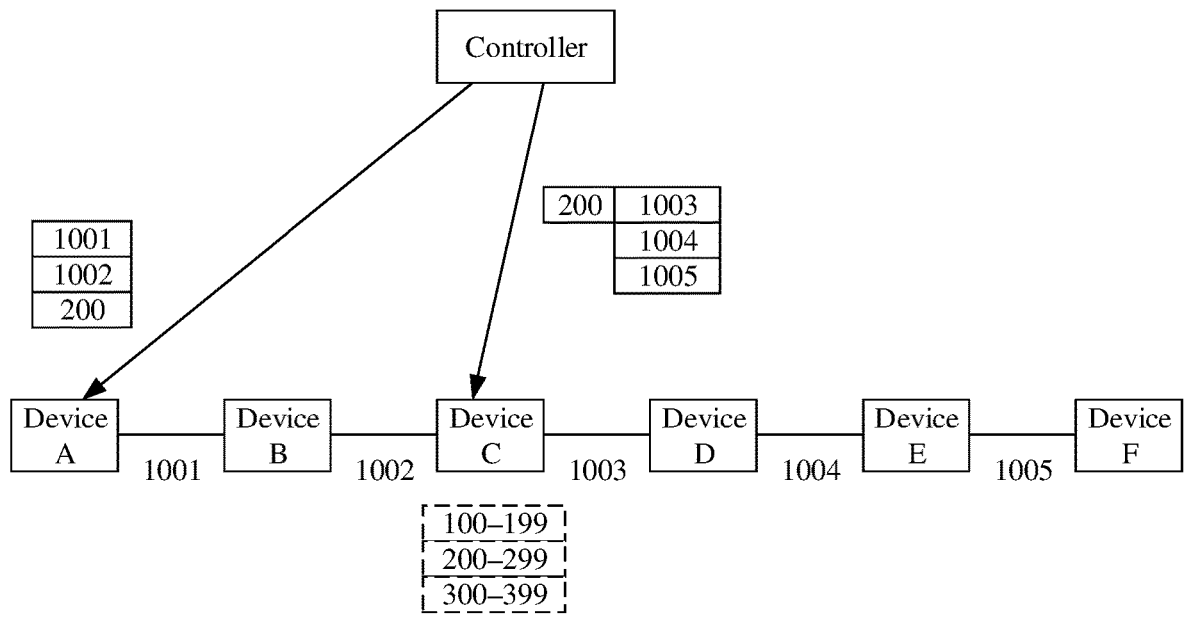
FIG. 1 is a schematic diagram of an application scenario according to an embodiment of this application.

FIG. 1 is a schematic diagram of an application scenario according to an embodiment of this application. SR divides a network path into segments, and allocates segment identifiers (segment ID, SID) to these segments and a forwarding node (which may also be referred to as a forwarding device) in a network. During SR forwarding, a label may be used as a segment identifier. In this way, one label may identify one segment of path, one forwarding node, or a link of one forwarding node. In FIG. 1, there is an LSP from a device A to a device F. An ingress device on the LSP is the device A, and an egress device on the LSP is the device F. The device A, a device B, a device C, a device D, a device E, and the device F may be devices that support label forwarding, such as a router or a switch. A label 1001 identifies a path from the device A to the device B. Similarly, labels 1002 to 1005 respectively identify a path from the device B to the device C, a path from the device C to the device D, a path from the device D to the device E, and a path from the device E to the device F.

When a packet needs to be forwarded from the device A to the device F, a label stack needs to be pushed into the packet. The label stack is {1001, 1002, 1003, 1004, 1005}. The label 1001 is at a top of the stack, the label 1005 is at a bottom of the stack, and the label stack may be carried in a packet header. After receiving the packet carrying the label stack {1001, 1002, 1003, 1004, 1005}, the device A detects that the label 1001 is at the top of the stack. An operation instruction corresponding to the label 1001 may be "pop" (pop), and the label 1001 identifies the path between the device A and the device B. Therefore, the device A pops the label 1001 out of the label stack, and the packet including a label stack {1002, 1003, 1004, 1005} is forwarded to the device B along the path that is between the device A and the device B and that is identified by the label 1001. In this case, the label 1002 is at a top of the label stack. Therefore, from the device A to the device E, a topmost label is popped out one by one based on a path indicated by the topmost label and an instruction (for example, "pop") corresponding to the topmost label, and the packet is forwarded to the device F along a forwarding path.

Figure 2:
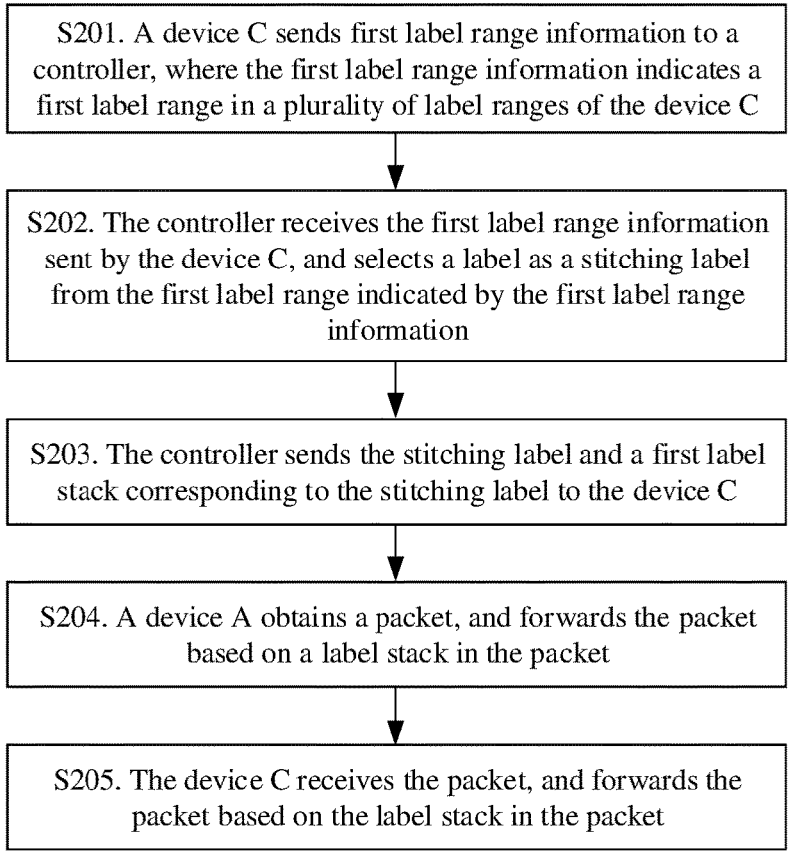
FIG. 2 shows a method for using a stitching label according to an embodiment of this application.

When a maximum label stack depth supported by an intermediate device on the forwarding path, for example, the device B, is 3, the label stack {1002, 1003, 1004, 1005} whose stack depth is 4 cannot be processed. Therefore, the foregoing forwarding process cannot be completed. In this case, a controller (for example, a server or a host) shown in FIG. 1 may divide the label stack, for example, divide the label stack into two label stacks {1001, 1002} and {1003, 1004, 1005}, and stitch the two label stacks by using a stitching label. The stitching label has a specific label value, and an operation instruction corresponding to the specific label value may be "swap" (swap). The intermediate device detects a label value when detecting a topmost label, and executes a corresponding operation instruction based on the label value. If the topmost label is a stitching label, the corresponding operation instruction is "swap". To be specific, the intermediate device replaces, in the label stack of the packet, the stitching label with a plurality of labels corresponding to the stitching label. The following describes, with reference to FIG. 2, a method for using a stitching label according to an embodiment of this application. The method shown in FIG. 2 may be applied to the scenario shown in FIG. 1.

S201. The device C sends first label range information to a controller, where the first label range information indicates a first label range in a plurality of label ranges of the device C.

The device C is an intermediate device that supports a stitching label. As shown in FIG. 1, for example, the device C includes three label ranges: {100-199}, {200-299}, and {300-399}. The label range of the device C is limited by a label resource on the device C. The device C may set a plurality of label ranges based on the label resource of the device C, and select, from the plurality of label ranges, a label range that is provided for the controller and that may be used for the stitching label. Each of the plurality of label ranges may also be referred to as a label space block. Sizes (namely, a quantity of included labels) of the label ranges may be equal or unequal, and each label space block is a minimum allocation unit. The device C provides, on a basis of each label space block, the controller with a label space block in which the stitching label may be selected (which may also be referred to as "allocated"). In a possible implementation, the label space block may include one label or a plurality of labels, and the plurality of labels may be consecutive or inconsecutive labels.

It should be emphasized that, fine-grained division is performed on the label resource on the device C, and the label resource is divided into a plurality of label space blocks for fine-grained provisioning. Not all label resources need to be provided for the controller for allocating the stitching label. Therefore, a disadvantage that a stitching device needs to reserve a large quantity of label resources for the controller can be overcome (The controller sends a large quantity of stitching labels to each stitching device, and these stitching labels can be normally used only when the stitching labels belong to label space of each stitching device. A large quantity of label resources needs to be reserved on each stitching device for the controller in advance, to ensure that the controller has sufficient label space). This helps reduce label resource waste. Especially for a device with a limited label resource, it is more necessary to reduce label resource waste. After a plurality of label space blocks are obtained through division on the stitching device, a label space block that is not provided for the controller may be used by the stitching device for allocation of an adjacent label or a node label on the stitching device, to further improve label resource utilization efficiency. During SR forwarding, the intermediate device may use one label to identify one segment of path or one forwarding node. A label that identifies a segment of adjacent path to an adjacent device may be referred to as an adjacent label, and a label that identifies a forwarding node or a forwarding device may be referred to as a node label. For example, in FIG. 1, the device C may use the label 1003 as an adjacent label to identify the path from the device C to the device D, and may use a label 1009 as a node label to identify the device D or the device E.

The first label range information indicates one label range in the plurality of label ranges of the device C, and the indicated label range may also be referred to as the first label range, for example, the label range {200-299} shown in FIG. 1. The first label range information may include a start label value and a range size, for example, 200 and 100, or may include the start label value and an end label value, for example, 200 and 299.

The device C may send label range information to the controller in a device initialization phase or when establishing a connection to the controller, or may send the label range information to the controller at a preset time point, or send the label range information in response to a label request message after receiving the label request message sent by the controller. The label request message may be used to request the label range information. After receiving the label request message, the device C sends the label range information, to implement on-demand allocation. The controller sends the label request message when the controller needs to select the stitching label or when an available label included in a label range in which the stitching label is selected is insufficient, so that the label resource can be used more effectively.

The controller may include second label range information. In other words, the controller may store the second label range information. The second label range information indicates a second label range in the plurality of label ranges of the device C, for example, the label range {100-199} shown in FIG. 1. The controller may send the label range information when detecting that an available label in the second label range is insufficient, to request more label ranges. The available label is not selected as a stitching label. That an available label in a label range is insufficient means that, for example, a quantity of available labels in the label range is less than a threshold, or a proportion of the available label in the label range is less than a threshold. For example, in the label range {100-199}, when labels 100 to 190 are selected as stitching labels, a quantity of available labels is 9, which is less than a threshold 10, or a proportion of the available labels is 9%, which is less than a threshold 10%. The threshold may be preset based on a required quantity of stitching labels. When the threshold is set to 0, the controller sends label range information to a stitching device when there is no available label. When the controller may select one label from the label range as a stitching label, the controller may record the selected label as a used label. In this way, the controller may detect a quantity of used labels, a quantity of available labels, or a proportion of the available labels in the label range. The second label range information may be sent by the device C to the controller before the device C sends the first label range information.

The device C may send the second label range information to the controller in response to the request message, or may proactively send the second label range information to the controller. The second label range information may alternatively be preconfigured on the controller.

Before sending the label range information to the controller, the device C may first detect a previous available label range of the device C, so that the label range information sent to the controller indicates the detected available label range. The device C may manage a label range of the device C, record an available label range and a used (which may also be referred to as an unavailable) label range, and select a label range from the available label range when providing the label range for the controller, to avoid repeated use of the label range. After the device C sends the label range information to the controller, an available label range indicated by the label range information is provided for the controller for allocation of the stitching label. After the device C sends the label range information to the controller to indicate the available label range, and provides the available label range for the controller, the provided label range may be recorded as a used label range of the device C. After receiving the stitching label sent by the controller, the device C may record, based on a range in which the stitching label is located, that the range in which the stitching label is located is used. The device C may allocate an adjacent label or a node label by using the available label range of the device C. Therefore, through fine-grained division, the device C and the controller may share the label resource on the device C, to improve label resource utilization efficiency. For example, in FIG. 1, the device C may use a label 301 in the label range {300-399} as an adjacent label to identify the path from the device C to the device D, and does not need to use the label 1003. After using any label as an adjacent label or a node label, the device C records that a range in which the any label is located is used.

For example, the available label range is shown in FIG. 1. For example, the device C includes the three label ranges: {100-199}, {200-299}, and {300-399}. The label range of the device C is limited by the label resource on the device C. The device C may set a plurality of label ranges based on the label resource of the device C, and select, from the plurality of label ranges, a label range that is provided for the controller and that may be used for the stitching label. The device C may flexibly set the plurality of label ranges based on the label resource of the device C and an actual use requirement. Each of the plurality of label ranges may also be referred to as a label space block. Sizes (namely, a quantity of included labels) of the label ranges may be equal or unequal, and each label space block is a minimum allocation unit. The device C provides, on a basis of each label space block, the controller with a label space block in which the stitching label may be selected (which may also be referred to as "allocated").

Before the device C sends the first label range information to the controller or the controller sends the label request message to the device C, the controller may establish a southbound connection to the device C by using a path computation element communication protocol (PCEP), a network configuration protocol (NETCONF), or the like. The controller may also establish southbound connections to all devices that support the stitching label in a network.

S202. The controller receives the first label range information sent by the device C, and selects a label as the stitching label from the first label range indicated by the first label range information.

The controller may calculate an entire forwarding path (which may also be referred to as a second label switched path) from an ingress device to an egress device. To reduce a label stack depth and resolve a problem that the intermediate device does not have a sufficient capability of supporting the label stack depth, the controller determines an intermediate device (which may also be referred to as a stitching device) on which stitching is to be performed. There may be one or more stitching devices. The entire forwarding path may be divided, by using the stitching device as a boundary point, into a plurality of label switched paths that are head-to-tail connected. There are one ingress device and one egress device on each label switched path. An ingress device of a first label switched path on the entire forwarding path from the ingress device to the egress device is the ingress device of the entire forwarding path, and an egress device of the first label switched path is a first stitching device on the entire forwarding path from the ingress device to the egress device. An ingress device of a label switched path other than the first label switched path is a stitching device, and an egress device of the label switched path is a stitching device or the egress device of the entire forwarding path. The controller may select one corresponding stitching label for one of a plurality of label switched paths, or may select a plurality of corresponding stitching labels for the plurality of label switched paths. One stitching label corresponds to one label switched path. When selecting a corresponding stitching label for each label switched path, the controller selects the stitching label from a label range that is provided by an ingress device of the label switched path and that may be used for the stitching label. For example, as shown in FIG. 1, the controller calculates an entire forwarding path from the ingress device A to the egress device F, and determines that a label stack depth 5 required by the entire forwarding path exceeds a support capability of the intermediate device for the label stack depth (assumed to be 3). The controller calculates that an intermediate device on which stitching is performed is the device C. The entire forwarding path (namely, a path from the device A to the device F), separated by the device C, may be divided into two label switched paths: a path 1 from the device A to the device C and a path 2 from the device C to the device F. The path 1 and the path 2 are head-to-tail connected. An ingress device of the path 1 is the device A, and an egress device is the device C. An ingress device of the path 2 is the device C, and an egress device is the device F. The controller selects, from the label range {200-299} provided by the ingress device (namely, the device C) of the path 2, a label 200 as a stitching label 200 corresponding to the path 2. In other words, the device C stitches the path 2 by using the stitching label 200.

The controller may generate a plurality of label stacks based on an entire path. The plurality of label stacks include a label stack corresponding to a stitching label, for example, a label stack {1003, 1004, 1005} corresponding to the stitching label 200 in FIG. 1. The label stack corresponding to the stitching label indicates a segment of label path starting from the intermediate device (namely, the first label switched path). When only the intermediate device is a stitching device, an egress device of the first label switched path is the egress device of the entire forwarding path. When there is a next stitching device after the intermediate device on the entire forwarding device from the ingress device to the egress device, the egress device of the first label switched path is the next stitching device. As shown in FIG. 1, the label stack {1003, 1004, 1005} corresponding to the stitching label 200 indicates a segment of label switched path starting from the device C, and the egress device of the first label switched path is the egress device (namely, the device F) of the entire forwarding path from the device A to the device F.

The plurality of label stacks generated by the controller based on the entire path may further include a second label stack, and the second label stack may be sent by the controller to the ingress device to guide packet forwarding. The second label stack includes a plurality of labels. The plurality of labels include a stitching label used in the entire forwarding path, and there may be one or more stitching labels used in the entire forwarding path. In the second label stack, from a topmost label to a first stitching label, a label before the first stitching label indicates a third label switched path. The third label switched path is from the ingress device to the first stitching device on the entire forwarding path. As shown in FIG. 1, the second label stack {1001, 1002, 200} includes a stitching label, namely, the stitching label 200. In the second label stack, the topmost label is the label 1001, and the label before the first stitching label is the label 1002. The label 1001 to the label 1002 indicate a label switched path from the device A to the device C.

S203. The controller sends the stitching label and a first label stack corresponding to the stitching label to the device C.

There is a correspondence between the first label stack and the stitching label. The stitching label 200 shown in FIG. 1 corresponds to the label stack {1003, 1004, 1005}.

The controller sends, to each intermediate device, a stitching label selected from a label range provided by each intermediate device and a label stack corresponding to the sent stitching label. As shown in FIG. 1, the controller sends, to the device C, the stitching label 200 and the first label stack {1003, 1004, 1005} corresponding to the stitching label 200. There is a correspondence between the stitching label 200 and the first label stack. In this application, there is a correspondence between a stitching label and a label stack corresponding to the stitching label. After receiving the stitching label 200 and the first label stack, the device C may record, in a forwarding entry, the stitching label and an operation instruction corresponding to the stitching label as "swap" (swap). To be specific, the stitching label 200 is replaced with the first label stack. Therefore, when receiving the stitching label 200, the device C may check the operation instruction corresponding to the stitching label, and replace the stitching label with the corresponding first label stack {1003, 1004, 1005}, so that a packet is forwarded along a forwarding path from the device C to the device F. After recording, in the forwarding entry, the stitching label and the operation instruction corresponding to the stitching label as "swap" (swap), the device C may further return a result message to the controller, to notify the controller of successful recording in the forwarding entry on the device C. When there is another stitching device on the forwarding path, a processing manner is similar to that of the device C. Details are not described herein again.

After the controller sends the stitching label and the label stack corresponding to the stitching label to the intermediate device, the controller may further send the second label stack generated in step 202 to the ingress device of the entire label switched path. As shown in FIG. 1, the controller sends the second label stack {1001, 1002, 200} to the ingress device A. The stitching label 200 is located below the label 1001 and the label 1002 that are used for the path from the device A to the device C, to form the label stack {1001, 1002, 200}. After sending the stitching label 200 and the first label stack to the device C, or after receiving a response message returned by the device C, the controller may send the second label stack to the device A, to avoid a packet forwarding error. For example, a forwarding entry of an ingress device on a forwarding path is set successfully, and a packet is forwarded, but a forwarding entry of a downstream device is not set successfully. Consequently, a forwarding error occurs when the packet is forwarded to the downstream device.

When sending the second label stack to the ingress device, the controller may further send a service identifier together, to instruct the ingress device to establish a correspondence between the second label stack and the service identifier. Therefore, when receiving a packet having the service identifier, the ingress device pushes the second label stack corresponding to the service identifier into a packet header for forwarding. The service identifier is, for example, 5-tuple, a destination address, a source address, or a device identifier.

S204. The device A obtains a packet, and forwards the packet based on a label stack in the packet.

The device A obtains a packet including the label stack {1001, 1002, 200}. An obtaining manner may be: obtaining a packet including a service identifier from a device other than a device on a label switched path, and pushing the label stack {1001, 1002, 200} corresponding to the service identifier into a packet header. The device A detects that the label 1001 is at a top of the stack, and the label 1001 identifies a path from the device A to a device B. Therefore, the device A pops the label 1001 out of the label stack, and the packet is forwarded to the device B along the path that is from the device A to the device B. In this case, the label stack in the packet is {1002, 200}, and the label 1002 is at the top of the label stack.

Similarly, after receiving the packet, the device B pops out the topmost label 1002 from the label stack and continues to forward the packet to the device C.

S205. The device C receives the packet, and forwards the packet based on the label stack in the packet.

The label stack included in the packet that is sent by the device B and that is received by the device C is {200}. A topmost label of the label stack is the stitching label 200 sent by the controller to the device C, and the operation instruction that corresponds to the stitching label 200 and that is recorded on the device C is "swap" (swap). In this case, the packet may also be referred to as a first packet. The device C detects that the topmost label of the stack is the label 200, and checks the operation instruction corresponding to the label 200. The operation instruction corresponding to the label 200 is "swap". Therefore, the device C replaces the original label stack {200} with the first label stack {1003, 1004, 1005}. Specific replacement is that, for example, the label 200 is first popped out, and labels 1003, 1004, and 1005 are pushed, so that the label stack in the packet is changed into {1003, 1004, 1005}. In this case, the packet may also be referred to as a second packet. The device C detects that the label 1003 is at the top of the stack and an operation instruction corresponding to the label 1003 is "pop", the device C pops out the label 1003. Based on a path indicated by the label 1003 (a path from the device C to a device D), the packet is forwarded to the device D along the path that is from the device C to the device D. In this case, the label stack in the packet is {1004, 1005}, and the label 1004 is at the top of the label stack. The first label stack {1003, 1004, 1005} indicates a label switched path from the device C to the device F, namely, the first label switched path, and the device D is a next hop device of the device C on the first label switched path.

After receiving the packet, the device D pops out the topmost label 1004 and forwards the packet to the device E, which is similar to processing performed by the device B. Similarly, after receiving the packet, the device E pops out the topmost label 1005 and forwards the packet to the device F. In this case, the labels 1001, 1002, 200, 1003, 1004, and 1005 pushed in a forwarding process are all popped out. After receiving the packet, the device F obtains a payload in the packet, to implement forwarding from the device A to the device F.

Figure 3:
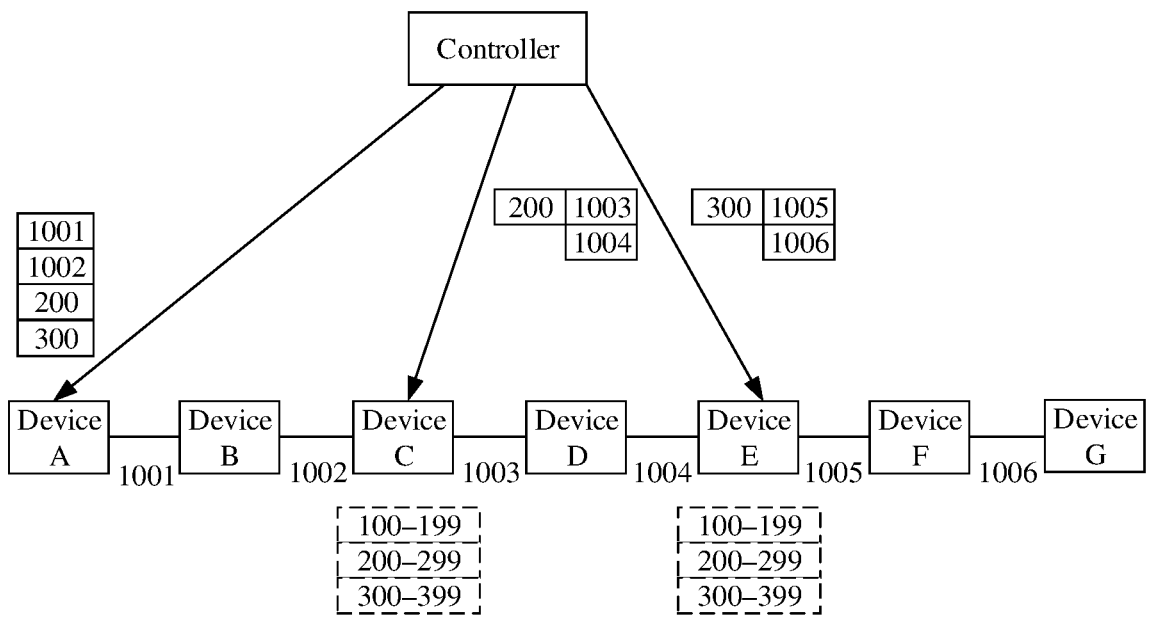
FIG. 3 is a schematic diagram of an application scenario according to an embodiment of this application.

FIG. 3 is a schematic diagram of an application scenario according to an embodiment of this application. In a scenario in which there are a plurality of stitching devices, for example, there are two stitching devices: a device C and a device E in FIG. 3, a controller establishes a connection to each of the plurality of stitching devices. An entire label switched path may be divided into a plurality of segments, namely, a plurality of paths. For example, there are three paths in FIG. 3: a path x from a device A to the device C, a path y from the device C to a device E, and a path z from the device E to a device G. The path y corresponds to a stitching label 200, and the path z corresponds to a stitching label 300. The controller sends the stitching label 300 and a corresponding label stack {1005, 1006} to the device E, sends the stitching label 200 and a corresponding label stack {1003, 1004} to the device C, and sends a second label stack {1001, 1002, 200, 300} to the device A. In the label stack {1001, 1002, 200, 300}, a label 1001 and a label 1002 are used by the path x. The stitching label 200 is below the label 1002, the stitching label 300 is below the stitching label 200, and the stitching label 300 is a bottommost label of the second label stack. A label stack used on the ingress device A includes a plurality of stitching labels used on an entire forwarding path. For example, in FIG. 3, the stitching label 200 is used to replace a label 1003 and a label 1004, and the stitching label 300 is used to replace a label 1005 and a label 1006, so that a label stack depth is reduced. A maximum label stack depth supported by the device A is 4. The device C includes a plurality of label ranges, and sends label range information to provide an available label range for the controller, for example, provide an available label range 200-299. The device E includes a plurality of label ranges, and sends label range information to provide an available label range for the controller, for example, provide an available label range 300-399. The controller records and uses the label range provided by the device C and the label range provided by the device E, selects a stitching label used for the device C in the label range provided by the device C, and selects a stitching label used for the device E in the label range provided by the device E. The label range of the device C and the label range of the device E may be independent of each other. A label stack in a packet received by the device C is {200, 300}. The device C replaces the stitching label 200 with the label 1003 and the label 1004 based on an operation instruction "swap" corresponding to the label 200, and a label stack in the packet sent by the device C is {1004, 300}. A label stack in a packet received by the device E is {300}. The device E replaces the stitching label 300 with the label 1005 and the label 1006 based on an operation instruction "swap" corresponding to the label 300, and a label stack in the packet sent by the device E is {1006}. Processing of the stitching label and the label stack performed by the controller and each device in FIG. 3 is similar to processing shown in FIG. 1 and FIG. 2. Details are not described herein again. In FIG. 3, the label stack {1003, 1004} corresponding to the stitching label 200 indicates a segment of label switched path starting from the device C, namely, a label switched path from a current stitching device (namely, the device C) to a next stitching device (namely, the device E). The label stack {1005, 1006} corresponding to the stitching label 300 indicates a segment of label switched path starting from the device E, namely, a label switched path from a current stitching device (namely, the device E) to an egress device of the entire forwarding path (namely, the device G).

Figure 4:
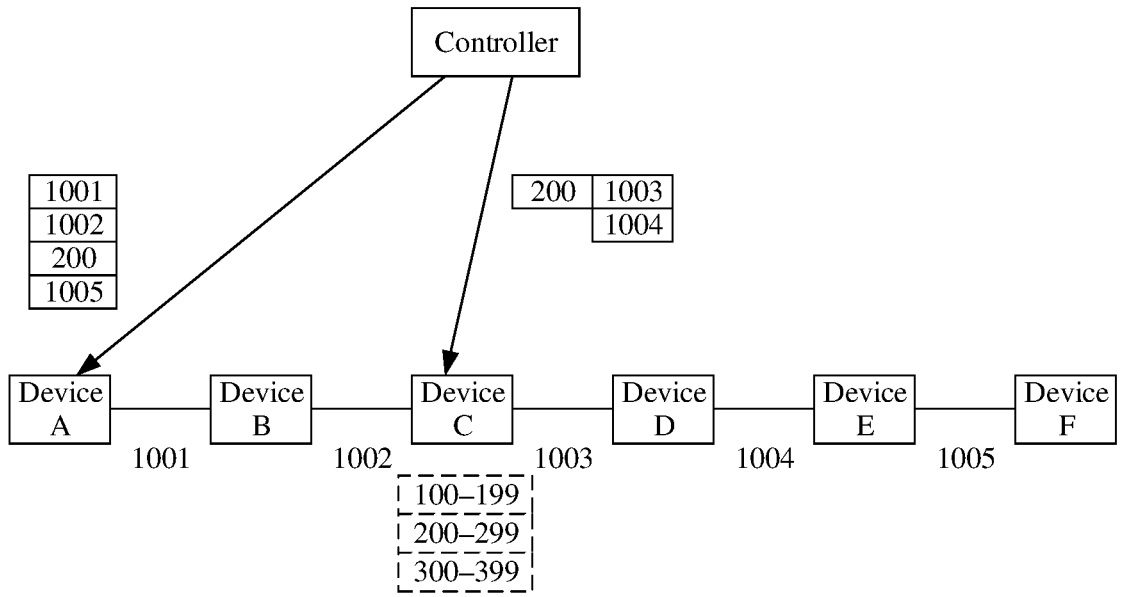
FIG. 4 is a schematic diagram of an application scenario according to an embodiment of this application.

FIG. 4 is a schematic diagram of an application scenario according to an embodiment of this application. In FIG. 4, there is a stitching device, namely, a device C. An entire label switched path may be divided into a plurality of segments, namely, a plurality of paths. For example, there are three paths in FIG. 4: a path u from a device A to the device C, a path v from the device C to a device E, and a path w from the device E to a device F. Labels respectively corresponding to the three paths are a label 1001 and a label 1002, a label 1003 and a label 1004, and a label 1005. A maximum label stack depth supported by the device A is 4. A controller uses the device C as a stitching device, and the path v corresponds to a stitching label 200. The controller sends the stitching label 200 and a label stack {1003, 1004} corresponding to the stitching label to the device C, and sends a second label stack {1001, 1002, 200, 1005} to the device A. The second label stack includes a stitching label used on an entire forwarding path. In the second label stack, the label 1001 and the label 1002 are used by the path u, the stitching label 200 is below the label 1002, the label stack {1003, 1004} corresponding to the stitching label 200 is used by the path v, the label 1005 is below the stitching label 200, and the label 1005 is used by the path w. In a label stack used on the device A, the stitching label 200 replaces the label 1003 and the label 1004, so that a label stack depth is reduced. A label stack in a packet received by the device C is {200, 1005}. The device C replaces the stitching label 200 with the label 1003 and the label 1004 based on an operation instruction "swap" corresponding to the label 200, and a label stack in the packet sent by the device C is {1004, 1005}. Therefore, a next hop device D may send the packet to a downstream device based on the label stack {1004, 1005} in the packet. Processing of the stitching label and the label stack performed by the controller and each device in FIG. 4 is similar to processing shown in FIG. 1 and FIG. 2. Details are not described herein again. In FIG. 4, the controller uses the stitching label to process a label used by a segment of path (the path from the device C to the device E) in the entire label switched path, to reduce a label stack depth on the device A. In FIG. 4, the label stack {1003, 1004} corresponding to the stitching label 200 indicates a segment of label switched path starting from the device C, namely, the path v from the device C to the device E. The device E is an egress device of the path v.

Figure 5:
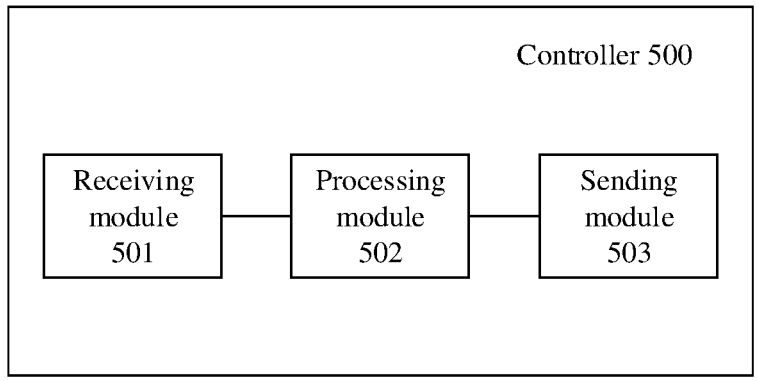
FIG. 5 is a structural diagram of a controller according to an embodiment of this application.

FIG. 5 is a structural diagram of a controller according to an embodiment of this application. As shown in FIG. 5, a controller 500 includes a receiving module 501, a processing module 502, and a sending module 503. The controller 500 may be configured to implement a function of the controller in the method shown in FIG. 2, the embodiment shown in FIG. 3, or the embodiment shown in FIG. 4. Optionally, the receiving module 501 may be configured to implement a receiving function of the controller in the method shown in FIG. 2, the embodiment shown in FIG. 3, or the embodiment shown in FIG. 4. The sending module 503 may be configured to implement a sending function of the controller in the method shown in FIG. 2, the embodiment shown in FIG. 3, or the embodiment shown in FIG. 4. The processing module 502 may be configured to implement a function that is other than sending and receiving and that is of the controller in the method shown in FIG. 2, the embodiment shown in FIG. 3, or the embodiment shown in FIG. 4.

The receiving module 501 is configured to receive first label range information sent by an intermediate device. The first label range information indicates a first label range in a plurality of label ranges of the intermediate device.

The processing module 502 is configured to select a label from the first label range as a stitching label.

The sending module 503 is configured to send the stitching label and a first label stack corresponding to the stitching label to the intermediate device. The first label stack indicates a first label switched path starting from the intermediate device.

Optionally, the sending module 503 is further configured to send a label request message to the intermediate device before the receiving module 501 receives the first label range information, and the label request message is used to request the first label range information.

Optionally, the controller stores second label range information, and the second label range information indicates a second label range in the plurality of label ranges of the intermediate device. Before the sending module 503 sends the label request message to the intermediate device, the processing module 502 detects that a quantity of available labels in the second label range is less than a first threshold, or a proportion of an available label in the second label range to all labels in the second label range is less than a second threshold. The available label in the second label range refers to a label that is not selected as the stitching label in the second label range.

The processing module 502 is further configured to: before the sending module 503 sends the stitching label and the first label stack corresponding to the stitching label to the intermediate device, calculate a second label switched path from an ingress device to an egress device, and generate a plurality of label stacks based on the second label switched path. The intermediate device is located between the ingress device and the egress device on the second label switched path, and the second label switched path includes the first label switched path. Each of the plurality of label stacks indicates a segment of label switched path on the second label switched path, and the plurality of label stacks include the first label stack.

Optionally, the sending module 503 is further configured to: before sending the stitching label and the first label stack corresponding to the stitching label to the intermediate device, send a second label stack to the ingress device. The second label stack includes the stitching label. In the second label stack, from a topmost label to the stitching label, a label before the stitching label indicates a third label switched path. The third label switched path is from the ingress device to the intermediate device on the second label switched path, and the plurality of label stacks include the second label stack.

Figure 6:
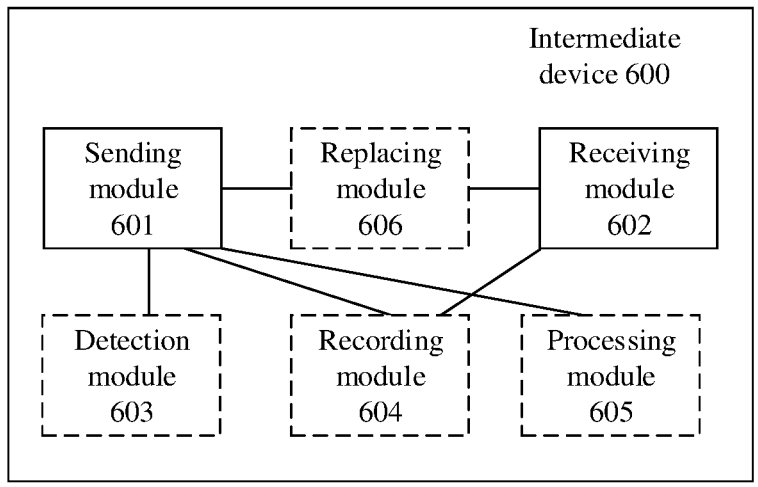
FIG. 6 is a structural diagram of an intermediate device according to an embodiment of this application.

FIG. 6 is a structural diagram of an intermediate device according to an embodiment of this application. As shown in FIG. 6, the intermediate device 600 includes a sending module 601 and a receiving module 602. The intermediate device 600 may be configured to implement a function of the stitching device, for example, the intermediate device C in the method shown in FIG. 2 and the embodiment shown in FIG. 4, or may be configured to implement functions of the device C and the device E in the embodiment shown in FIG. 3. Optionally, the receiving module 602 may be configured to implement a receiving function of the intermediate device in the method shown in FIG. 2, the embodiment shown in FIG. 3, or the embodiment shown in FIG. 4. The sending module 601 may be configured to implement a sending function of the intermediate device in the method shown in FIG. 2, the embodiment shown in FIG. 3, or the embodiment shown in FIG. 4. A detection module 603, a recording module 604, a replacing module 606, a processing module 605 may be configured to implement functions of detecting, recording, replacing, and setting a label range that are of the intermediate device in the method shown in FIG. 2, the embodiment shown in FIG. 3, or the embodiment shown in FIG. 4. Optionally, the processing module 605 may further be configured to implement functions that are other the functions of receiving, sending, and detecting, recording, replacing, and setting a label range and that are of the intermediate device in the method shown in FIG. 2, the embodiment shown in FIG. 3, or the embodiment shown in FIG. 4.

The sending module 601 is configured to send label range information to a controller. The label range information indicates one label range in a plurality of label ranges of the intermediate device. In response to a label request message, the sending module 601 sends the label range information to the controller.

The receiving module 602 is configured to receive a stitching label and a label stack corresponding to the stitching label that are sent by the controller. The label stack indicates a segment of label switched path starting from the intermediate device, and the stitching label is in the one label range.

Optionally, before the sending module 601 sends the label range information, the receiving module 602 is further configured to receive the label request message sent by the controller.

Optionally, the intermediate device 600 further includes the detection module 603. Before the sending module 601 sends the label range information, the detection module 603 is configured to detect that the one label range is available.

Optionally, the intermediate device 600 further includes the recording module 604. After the receiving module 602 receives the stitching label, the recording module 604 is configured to record that a label range in which the stitching label is located is used.

Optionally, the intermediate device 600 further includes the recording module 604. After any label in any label range in the plurality of label ranges is used as an adjacent label or a node label, the recording module 604 records that the any label range is used.

Optionally, the intermediate device further includes the processing module 605. Before the sending module 601 sends the label range information, the processing module 605 is configured to set the plurality of label ranges based on a label resource on the intermediate device.

Optionally, the intermediate device further includes the replacing module 606. After the receiving module 602 receives the stitching label and the label stack corresponding to the stitching label that are sent by the controller, the receiving module 602 further receives a first packet including the stitching label. The replacing module 606 replaces the stitching label in the first packet with the label stack corresponding to the stitching label to obtain a second packet. The sending module 601 sends the second packet to a next hop device of the intermediate device 600 on the segment of label switched path indicated by the label stack.

Optionally, any two or more of the detection module 603, the recording module 604, the processing module 605, and the replacing module 606 may be a same module.

Figure 7:
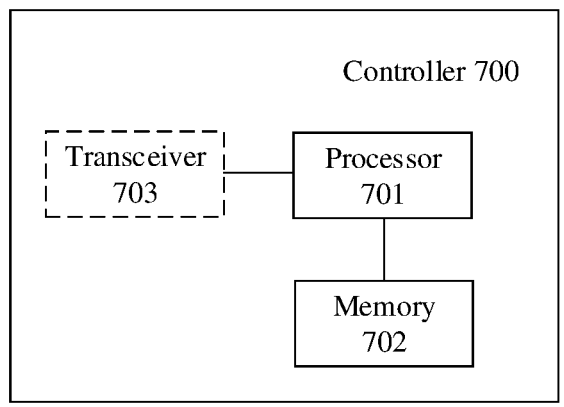
FIG. 7 is a structural diagram of a controller according to an embodiment of this application.

FIG. 7 is a structural diagram of a controller according to an embodiment of this application. As shown in FIG. 7, the controller 700 includes a processor 701 and a memory 702. The processor 701 is coupled to the memory 702. The memory 702 stores a computer program instruction. The processor 701 is configured to execute the computer program instruction, so that the controller 700 is enabled to implement a function of the controller in the method shown in FIG. 2, the embodiment shown in FIG. 3, or the embodiment shown in FIG. 4. The controller 700 may further include a transceiver 703, configured to communicate with another device, for example, receive various types of data and send various types of data to an intermediate device C. The transceiver 703 may also be divided into a receiver and a transmitter, to separately perform receiving and sending functions.

Figure 8:
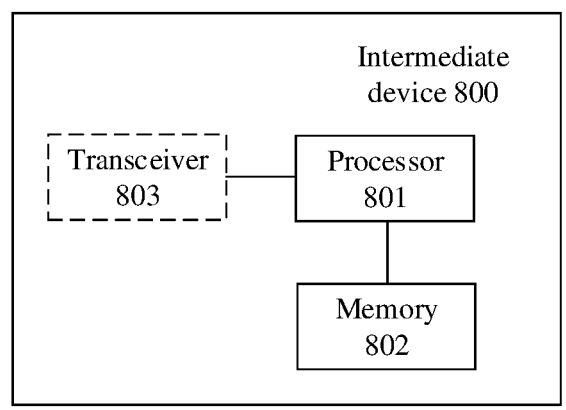
FIG. 8 is a structural diagram of a controller according to an embodiment of this application.

FIG. 8 is a structural diagram of an intermediate device according to an embodiment of this application. As shown in FIG. 8, the intermediate device 800 includes a processor 801 and a memory 802. The processor 801 is coupled to the memory 802. The memory 802 stores a computer program instruction. The processor 801 is configured to execute the computer program instruction, so that the intermediate device 800 is enabled to implement a function of the stitching device, for example, the intermediate device C in the method shown in FIG. 2 and the embodiment shown in FIG. 4, or may be configured to implement functions of the device C and the device E in the embodiment shown in FIG. 3. The intermediate device 800 may further include a transceiver 803, configured to communicate with another device, for example, receive various types of data and send various types of data to a controller. The transceiver 803 may also be divided into a receiver and a transmitter, to separately perform receiving and sending functions. The intermediate device 800 may be further configured to implement a function of a forwarding device (for example, the device A and the device B) other than the device C on the label forwarding path in FIG. 1 to FIG. 4.

The processor 701 and the processor 801 may be a central processing unit (CPU), a network processor (NP), or a combination of a CPU and an NP.

The memory 702 and the memory 802 may include a volatile memory, for example, a random access memory (RAM), or may include a nonvolatile memory, for example, a read-only memory (ROM), a flash memory, a hard disk drive (HDD), or a solid-state drive (SSD). Alternatively, the memory 702 and the memory 802 may include a combination of the foregoing types of memories. Optionally, the memory 702 may be integrated into the processor 701 as an internal component of the processor 701. The memory 802 may be integrated into the processor 801 as an internal component of the processor 801.

The transceiver 703 and the transceiver 803 may communicate with each other by using an Ethernet interface, an asynchronous transfer mode (ATM) interface, or a packet over SDH/SONET (POS) interface.

An embodiment of this application further provides a system. The system includes the controller and the intermediate device (for example, the device C) shown in FIG. 1, or includes the controller and the intermediate device (for example, the device C and the device E) shown in FIG. 3, or includes the controller and the intermediate device (for example, the device C) shown in FIG. 4. The controller included in the system may be the controller shown in FIG. 5 or FIG. 7, and the intermediate device included in the system may be the intermediate device shown in FIG. 6 or FIG. 8.

An embodiment of this application further provides a computer program product including a computer program instruction. When the computer program product runs on a controller, the controller is enabled to perform a function of the controller in the method shown in FIG. 2, the embodiment shown in FIG. 3, or the embodiment shown in FIG. 4.

An embodiment of this application further provides a computer program product including a computer program instruction. When the computer program product runs on an intermediate device, the intermediate device is enabled to implement a function of the stitching device, for example, the intermediate device C in the method shown in FIG. 2 and the embodiment shown in FIG. 4, or may be configured to implement functions of the device C and the device E in the embodiment shown in FIG. 3.

All or some of the foregoing embodiments may be implemented by using software, hardware, firmware, or a combination thereof. When the software is used to implement the embodiments, all or some of the embodiments may be implemented in a form of a computer program product. The computer program product includes one or more computer program instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer readable storage medium or may be transmitted from a computer readable storage medium to another computer readable storage medium. For example, the computer program instructions may be transmitted from a website, computer, server, or data center to another website, computer, server, or data center wiredly or wirelessly. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive), or the like.

What is claimed is:

1. A stitching label sending method, comprising:
   detecting, by a controller, that at least one of a quantity of available labels in a second label range is less than a first threshold, or a proportion of an available label in the second label range to all labels in the second label range is less than a second threshold, wherein the available label in the second label range is a label other than a label selected as a stitching label in the second label range;
   sending, by the controller, to an intermediate device, a label request message after detecting that the at least one of the quantity of available labels in the second label range is less than the first threshold, or the proportion of the available label in the second label range to all labels in the second label range is less than the second threshold, wherein the label request message requests first label range information, wherein the controller stores second label range information that indicates a second label range in a plurality of label ranges of the intermediate device;
   receiving, by the controller, after the sending the label request message, the first label range information sent by the intermediate device, wherein the first label range information indicates a first label range in a plurality of label ranges of the intermediate device;
   selecting, by the controller, a label from the first label range as the stitching label; and
   sending, by the controller, to the intermediate device, the stitching label and a first label stack corresponding to the stitching label, wherein the first label stack indicates a first label switched path starting from the intermediate device and wherein the stitching label binds the first label stack to a second label stack.

2. The method according to claim 1, further comprising performing, before the sending the stitching label and the first label stack:
   calculating, by the controller, a second label switched path that is from an ingress device to an egress device, wherein the intermediate device is located on the second label switched path between the ingress device and the egress device, and wherein the second label switched path comprises the first label switched path; and
   generating, by the controller, a plurality of label stacks according to the second label switched path, wherein each label stack of the plurality of label stacks indicates a segment of label switched path on the second label switched path, and wherein the plurality of label stacks comprise the first label stack.

3. The method according to claim 2, further comprising performing, after the sending the stitching label and the first label stack:
   sending, by the controller, the second label stack to the ingress device, wherein the second label stack comprises the stitching label;
   wherein, in the second label stack, from a topmost label to the stitching label, a label before the stitching label indicates a third label switched path, wherein the third label switched path is from the ingress device to the intermediate device on the second label switched path, and wherein the plurality of label stacks comprise the second label stack.

4. A stitching label receiving method, comprising:
   detecting, by an intermediate device, that one label range is available;
   sending, by the intermediate device, after detecting that the one label range is available, label range information to a controller, wherein the label range information indicates the one label range in a plurality of label ranges of the intermediate device;
   receiving, by the intermediate device, from the controller, a stitching label and a label stack corresponding to the stitching label, wherein the label stack indicates a segment of label switched path starting from the intermediate device, wherein the stitching label is in the one label range and wherein the stitching label binds the label stack to a second label stack; and
   recording, by the intermediate device, after receiving the stitching label, that a label range in which the stitching label is located is used.

5. The method according to claim 4, further comprising performing, before the sending the label range information:
   receiving, by the intermediate device, a label request message sent by the controller; and
   sending, by the intermediate device, in response to the label request message, the label range information to the controller.

6. The method according to claim 4, further comprising:
recording, by the intermediate device, after using any label in any label range as an adjacent label or a node label, that the any label range is used.

7. The method according to claim 4, further comprising performing, before the sending the label range information:
setting, by the intermediate device, the plurality of label ranges according to a label resource on the intermediate device.

8. The method according to claim 4, further comprising performing, after the receiving the stitching label and the label stack:
receiving, by the intermediate device, a first packet comprising the stitching label;
replacing, by the intermediate device, the stitching label in the first packet with the label stack and obtaining a second packet in response to the replacing; and
sending, by the intermediate device, the second packet to a next hop device of the intermediate device on the segment of label switched path.

9. A controller for sending a stitching label, comprising:
one or more processors; and
a non-transitory memory having stored thereon a program for execution by the one or more processors, the program comprising instructions to:
detect that at least one of a quantity of available labels in a second label range is less than a first threshold, or a proportion of an available label in the second label range to all labels in the second label range is less than a second threshold, wherein the available label in the second label range is a label other than a label selected as a stitching label in the second label range;
send, to an intermediate device, a label request message after detecting that the at least one of the quantity of available labels in the second label range is less than the first threshold, or the proportion of the available label in the second label range to all labels in the second label range is less than the second threshold, wherein the label request message requests first label range information, wherein the controller stores second label range information that indicates a second label range in a plurality of label ranges of the intermediate device;
receive, after the sending the label request message, first label range information sent by an intermediate device, wherein the first label range information indicates a first label range in a plurality of label ranges of the intermediate device;
select a label from the first label range as a stitching label; and
send, to the intermediate device, the stitching label and a first label stack corresponding to the stitching label, wherein the first label stack indicates a first label switched path starting from the intermediate device, and wherein the stitching label binds the first label stack to a second label stack.

10. The controller according to claim 9, wherein the program further includes instructions to:
send a label request message to the intermediate device before receiving the first label range information, wherein the label request message requests the first label range information.

11. An intermediate device for receiving a stitching label, comprising:
one or more processors; and
a non-transitory memory having stored thereon a program for execution by the one or more processors, the program comprising instructions to:
detect that one label range is available;
send label range information to a controller after detecting that the one label range is available, wherein the label range information indicates one label range in a plurality of label ranges of the intermediate device;
receive, from the controller, a stitching label and a label stack corresponding to the stitching label, wherein the label stack indicates a segment of label switched path starting from the intermediate device, wherein the stitching label is in the one label range, sand wherein the stitching label binds the label stack to a second label stack; and
record, after receiving the stitching label, that a label range in which the stitching label is located is used.

12. The intermediate device according to claim 11, wherein the program further includes instructions to:
receive a label request message sent by the controller before sending the label range information; and
send the label range information to the controller in response to label request message.

13. The intermediate device according to claim 11, wherein the program further includes instructions to record, after any label in any label range in the plurality of label ranges is used as an adjacent label or a node label, that the any label range is used.

14. The intermediate device according to claim 11, wherein the program further includes instructions to set, before sending the label range information, the plurality of label ranges according to a label resource on the intermediate device.

* * * * *